US012076294B2

(12) United States Patent
Liu et al.

(10) Patent No.: US 12,076,294 B2
(45) Date of Patent: Sep. 3, 2024

(54) NEGATIVE PRESSURE MASSAGE DEVICE WITH COLD FEELING MECHANISM AND MASSAGE STICK THEREOF

(71) Applicants: BIBOTING INTERNATIONAL CO., LTD., Taoyuan (TW); Po-Chang Liu, Taoyuan (TW)

(72) Inventors: Po-Chang Liu, Taoyuan (TW); Li-Pin Yuan, Taoyuan (TW)

(73) Assignees: BIBOTING INTERNATIONAL CO., LTD., Taoyuan (TW); Po-Chang Liu, Taoyuan (TW)

( * ) Notice: Subject to any disclaimer, the term of this patent is extended or adjusted under 35 U.S.C. 154(b) by 945 days.

(21) Appl. No.: 17/037,794

(22) Filed: Sep. 30, 2020

(65) Prior Publication Data

US 2022/0096312 A1 Mar. 31, 2022

(51) Int. Cl.
*A61H 9/00* (2006.01)
*A61H 23/00* (2006.01)

(52) U.S. Cl.
CPC ........... *A61H 9/0057* (2013.01); *A61H 23/00* (2013.01); *A61H 2201/0153* (2013.01);
(Continued)

(58) Field of Classification Search
CPC .................. A61H 9/0057; A61H 23/00; A61H 2201/0153; A61H 2201/0214;
(Continued)

(56) References Cited

U.S. PATENT DOCUMENTS 11,123,577 B2 * 9/2021 Blanche ............. A61H 23/0245
2008/0287839 A1 * 11/2008 Rosen .................... A61H 9/005 601/18
(Continued)

FOREIGN PATENT DOCUMENTS

CN 105935336 A 9/2016
CN 106512115 A * 3/2017
(Continued)

OTHER PUBLICATIONS

Office Action dated Dec. 28, 2020 of the corresponding Taiwan patent application No. 109128430.
(Continued)

*Primary Examiner* — Justine R Yu
*Assistant Examiner* — Matthew R Moon
(74) *Attorney, Agent, or Firm* — Chun-Ming Shih; HDLS IPR SERVICES

(57) ABSTRACT

A negative pressure massage device with cold feeling mechanism and a massage stick thereof are provided. The massage stick includes a stick body and a refrigeration module. The stick body includes a cover assembly, an end cover connected to the cover assembly, and a temperature transmitting member. The end cover includes a negative pressure connection hole. The temperature transmission member includes a suction port. The stick body further includes an air pipe communicates with the negative pressure connection hole and the suction port. The refrigeration module arranged inside of the stick body. The refrigeration module including a thermoelectric cooling chip and a heat sink. The thermoelectric cooling chip including a cold end and a hot end. The cold end attached to the temperature transmitting member. The hot end thermally contacts with the heat sink.

16 Claims, 6 Drawing Sheets

(52) U.S. Cl.
CPC ................ *A61H 2201/0214* (2013.01); *A61H 2201/0285* (2013.01); *A61H 2201/105* (2013.01); *A61H 2201/1238* (2013.01); *A61H 2201/1409* (2013.01); *A61H 2201/5025* (2013.01)

(58) Field of Classification Search
CPC ...... A61H 2201/0285; A61H 2201/105; A61H 2201/1238; A61H 2201/1409; A61H 2201/5025; A61H 23/0263; A61H 2201/0111; A61H 2201/10; A61H 2201/503
See application file for complete search history.

(56) References Cited

U.S. PATENT DOCUMENTS

| | | | | |
|---|---|---|---|---|
| 2015/0283022 | A1 * | 10/2015 | Lee | A61H 7/00 601/2 |
| 2016/0074641 | A1 * | 3/2016 | Mehta | A61H 23/02 604/315 |
| 2020/0179220 | A1 * | 6/2020 | Jablow | A61H 1/00 |
| 2020/0187986 | A1 * | 6/2020 | Hsu | A46B 15/0036 |
| 2020/0246520 | A1 * | 8/2020 | Chang | A61M 1/08 |
| 2022/0031556 | A1 * | 2/2022 | Liu | A61H 9/0057 |
| 2022/0395421 | A1 * | 12/2022 | Brown | A61H 9/0057 |

FOREIGN PATENT DOCUMENTS

| | | | | |
|---|---|---|---|---|
| CN | 210044242 | U | | 2/2020 |
| CN | 210301858 | U | * | 4/2020 |
| CN | 211357413 | U | | 8/2020 |
| CN | 111789753 | A | | 10/2020 |
| JP | 2018000656 | A | * | 1/2018 |
| KR | 200347828 | Y1 | * | 4/2004 |
| KR | 20150041219 | A | * | 6/2015 |
| TW | M333186 | | | 6/2008 |
| TW | M432419 | U | | 7/2012 |

OTHER PUBLICATIONS

Office Action dated May 25, 2022 of the corresponding China patent application No. 202011137201.8.

* cited by examiner

NEGATIVE PRESSURE MASSAGE DEVICE WITH COLD FEELING MECHANISM AND MASSAGE STICK THEREOF

BACKGROUND

Technical Field

The present disclosure relates to a massage device technology, and more particularly to a negative pressure massage device with cold feeling mechanism and a massage stick thereof.

Description of Related Art

The statements in this section merely provide background information related to the present disclosure and do not necessarily constitute prior art.

With progress and development of industrial and commercial society, modern people are always under various pressures in mode of advocating speed and efficiency. Moreover, with factors such as irregular diet, excessive intake of food and insufficient exercise, etc., people are prone to diseases related to cardiovascular disease or other unknown sources. In order to effectively achieve pressure relief and improve various functions of the body, various types of massage equipment for different purposes have been developed for market. Further, the massage stick in the massage equipment is widely favored and widely adopted by consumer market because of its low price, easy to use, and convenient to carry and operate.

A general massage stick mainly includes a stick body and a vibrator installed inside the stick body. By using the vibrator to drive the stick body to produce a corresponding vibration effect, and the stick body is pressed against shoulders, neck or other parts of human body, thereby achieving effects of massaging and pressure relief on various parts of the human body.

However, although the general massage stick has an effect of vibration and massage, for skin and its internal tissues cannot be fully exercised during actual use, and there is no improvement in activation and blood circulation of skin. In addition, after applying force to the stick body, it is very easy to produce blood stasis, redness or swelling on skin. It has been unable to meet existing market demand for massage sticks and massage devices.

In view of the above-mentioned deficiencies in prior art, we devote great concentration to research and cooperates with the application of scientific theory to solve above-mentioned problems as a purpose of our improvement.

SUMMARY

A purpose of the present disclosure is to provide a negative pressure massage device with cold feeling mechanism and a massage stick thereof. It can relieve redness and swelling of skin after the skin has massaged, and let the skin enjoy comfortable massage experience of cold feeling.

In order to achieve the purpose, the negative pressure massage device with cold feeling mechanism of the present disclosure includes a negative pressure massage stick, an external negative pressure generator, a connection pipe, and a conductive wire. The negative pressure massage stick includes a stick body and a refrigeration module. The stick body includes a cover assembly, an end cover is connected to two ends of the cover assembly, a temperature transmitting member, and an air pipe. The end cover includes a negative pressure connection hole and a first connection port. The temperature transmitting member includes a suction port. The air pipe communicates with the negative pressure connection hole and the suction port. The refrigeration module is arranged inside of the stick body. The refrigeration module includes a thermoelectric cooling chip and a heat sink. The thermoelectric cooling chip is electrically connected to the first connection port. The thermoelectric cooling chip includes a cold end and a hot end. The cold end is attached to the temperature transmitting member. The hot end is thermally contacted with the heat sink. The external negative pressure generator arranged separately from the negative pressure massage stick. The external negative pressure generator includes a housing, a negative pressure drive control module arranged in the housing, and a second connection port. The negative pressure drive control module includes an air pipe assembly. The air pipe assembly includes a negative pressure aperture arranged on the housing. The connection pipe includes two ends. The two ends of the connection pipe respectively connected to the negative pressure aperture and the negative pressure connection hole. The conductive wire includes two ends The two ends of the conductive wire respectively connected to the first connection port and the second connection port.

In order to achieve the purpose, the negative pressure massage stick with cold feeling mechanism of the present disclosure includes a stick body and a refrigeration module. The stick body includes a cover assembly, an end cover is connected to two ends of the cover assembly, a temperature transmitting member, and an air pipe. The end cover includes a negative pressure connection hole. The temperature transmitting member includes a suction port. The air pipe communicates with the negative pressure connection hole and the suction port. The refrigeration module is arranged inside of the stick body. The refrigeration module includes a thermoelectric cooling chip and a heat sink. The thermoelectric cooling chip includes a cold end and a hot end. The cold end is attached to the temperature transmitting member. The hot end thermally contacts the heat sink.

The present disclosure also has the following effects. With separate setting of the massage stick and the external negative pressure generator, the volume and weight of the massage stick are greatly reduced and the operation is easier. With combined use of a vibrator and a negative ion generation module, it can provide more diversified choices and somatosensory effects of massage. With the setting of the waterproof rubber strip assembly, the outside of the stick body can be washed and cleaned directly with water after use.

DETAILED DESCRIPTION

Figure 1:
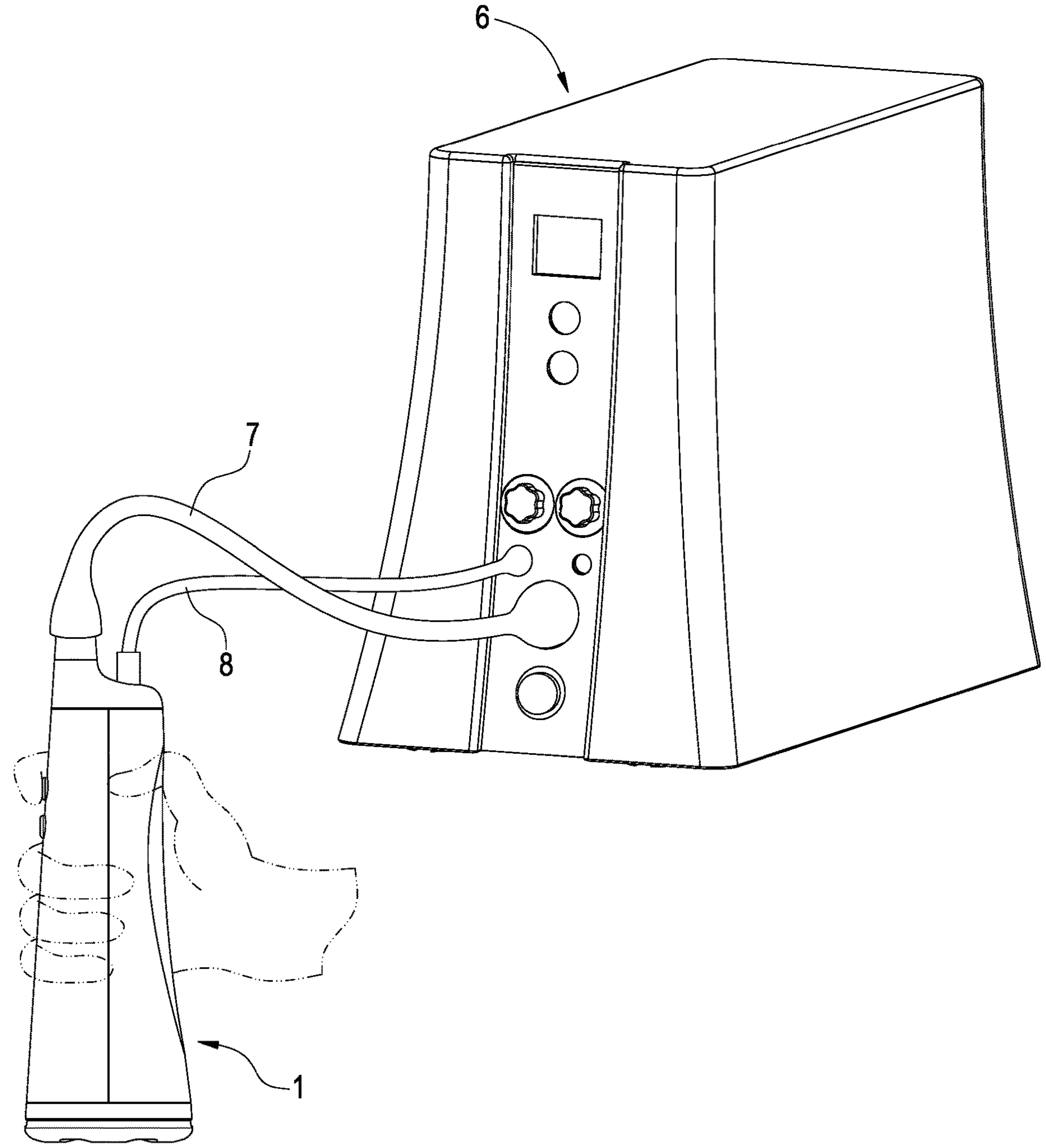
FIG. 1 is an assembled perspective view of a negative pressure massage device of the present disclosure.
Figure 2:
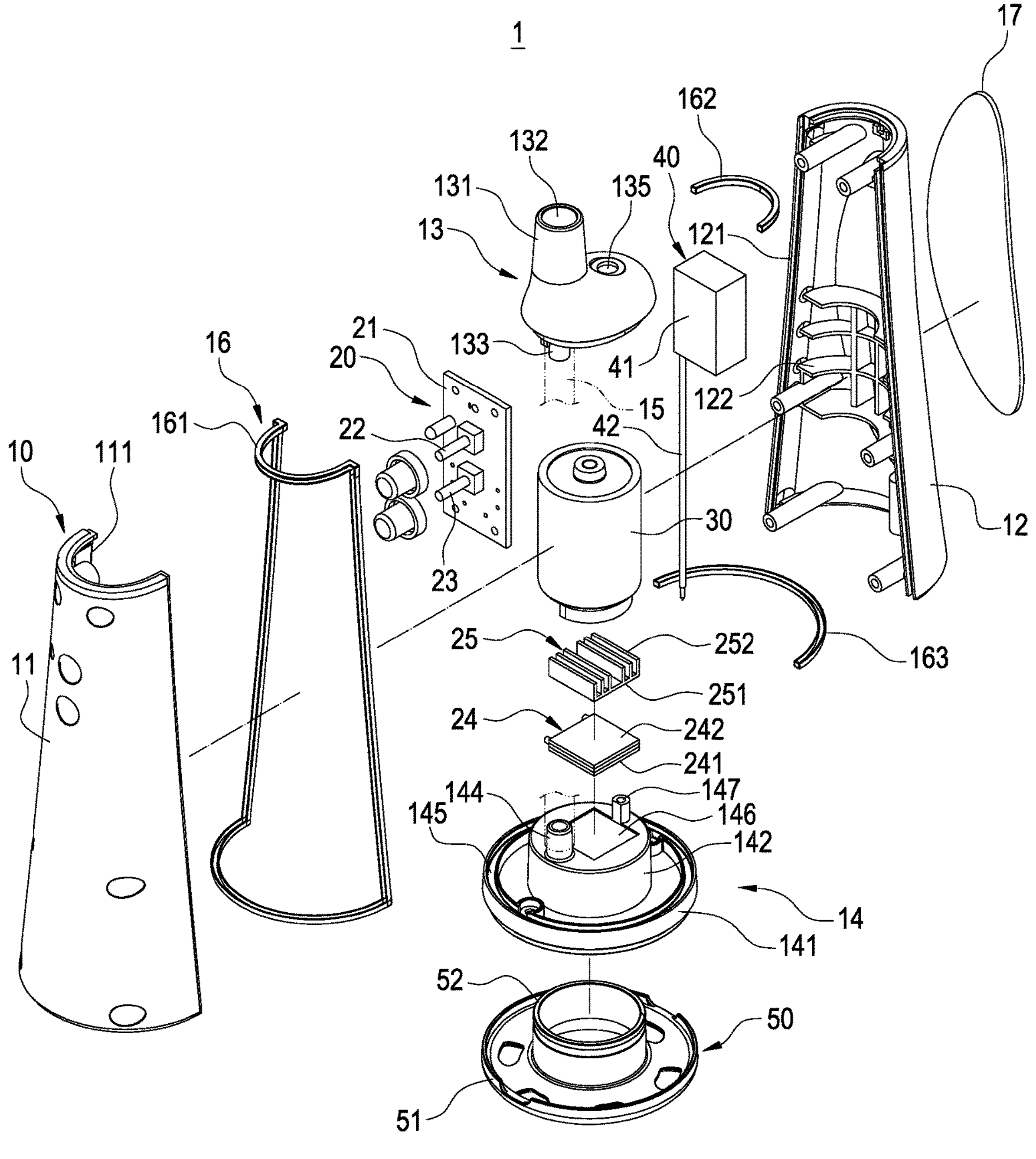
FIG. 2 is an exploded perspective view of a negative pressure massage stick of the present disclosure.
Figure 3:
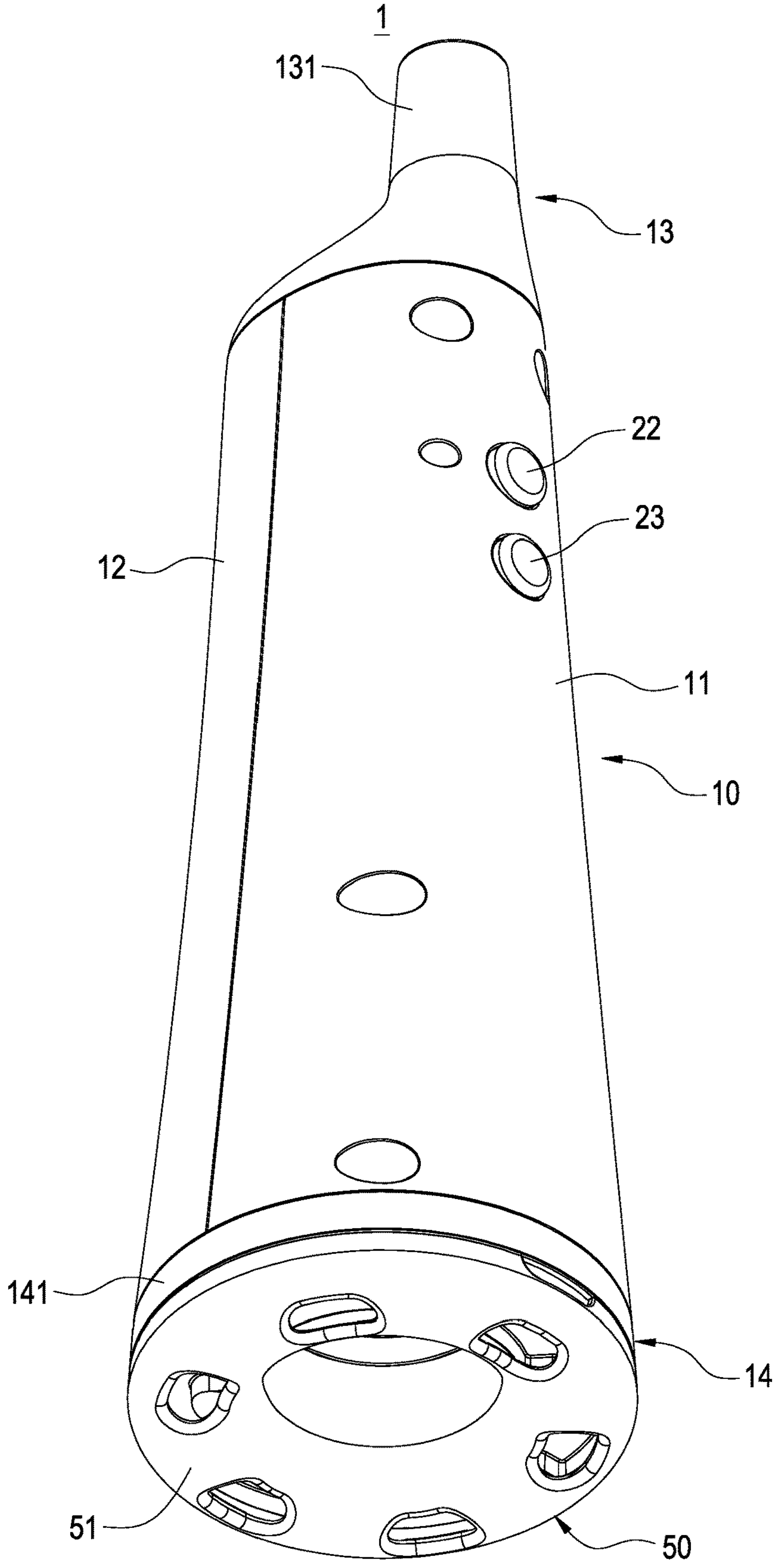
FIG. 3 is an assembled perspective view of the negative pressure massage stick of the present disclosure.
Figure 4:
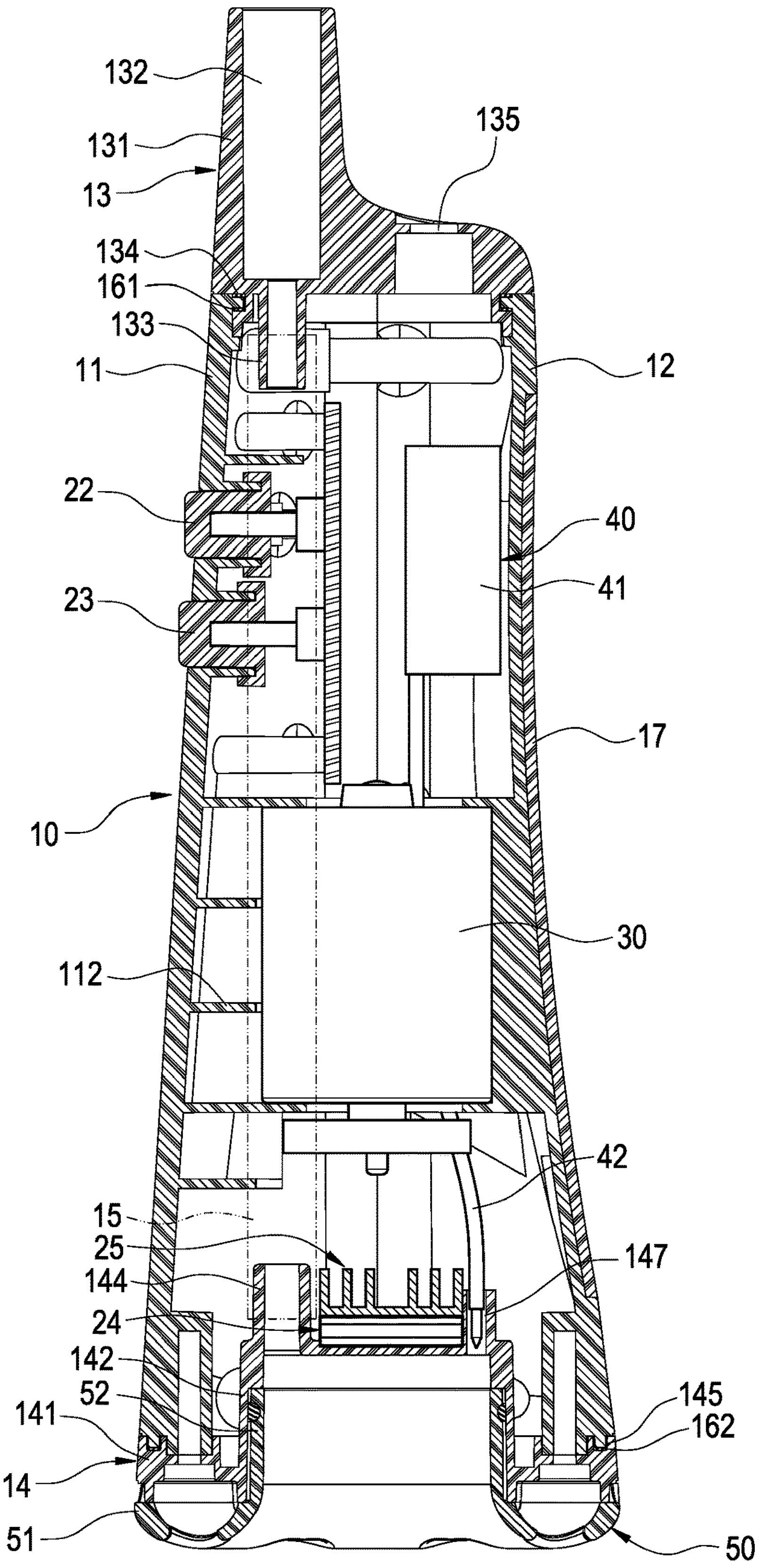
FIG. 4 is an assembled cross-sectional view of the negative pressure massage stick of the present disclosure.
Figure 5:
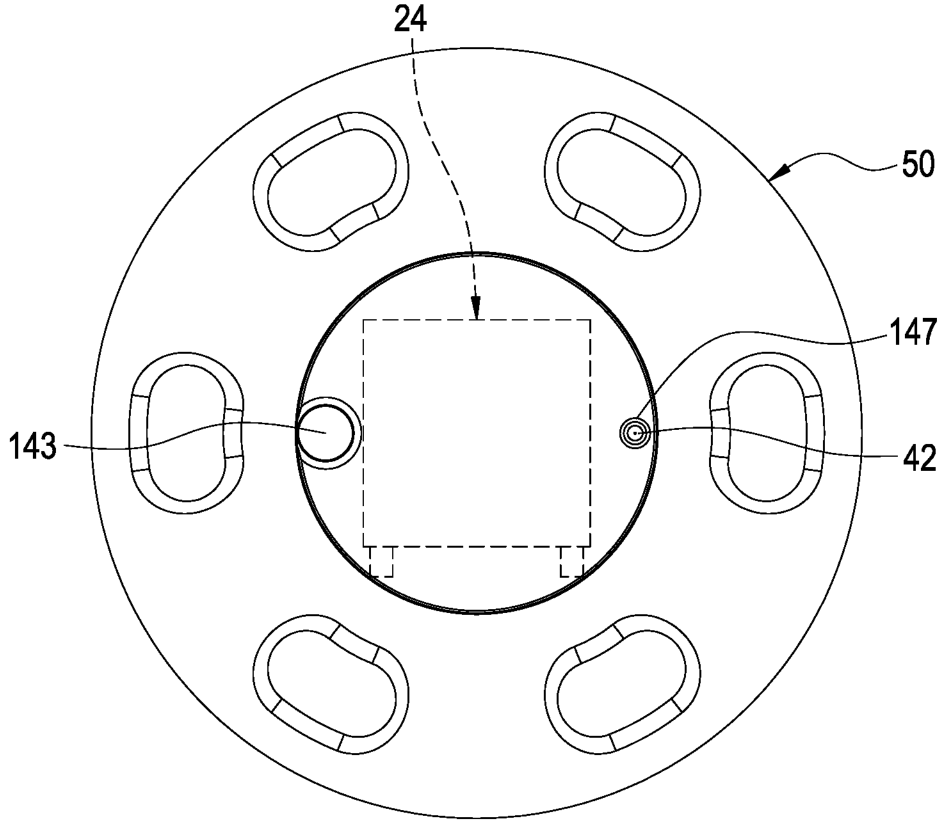
FIG. 5 is an assembled bottom view of the negative pressure massage stick of the present disclosure.

The detailed description and technical content of the present disclosure are described as follows in conjunction with the drawings. However, the drawings are only provided for reference and explanation, and are not intended to limit the present disclosure.

Please refer to FIG. 1 to FIG. 7. The present disclosure provides a negative pressure massage device with cold feeling mechanism and a massage stick thereof. The negative pressure massage device mainly includes a negative pressure massage stick 1, an external negative pressure generator 6, a connection pipe 7, and a conductive wire 8. The external negative pressure generator 6 is arranged separately from the negative pressure massage stick 1 (i.e., the external negative pressure generator 6 and the negative pressure massage stick 1 are separated devices). The connection and operation of the negative pressure massage stick 1 and the external negative pressure generator 6 can be achieved through the connection pipe 7 and the conductive wire 8.

Please refer to FIG. 2 to FIG. 5. The negative pressure massage stick 1 includes a stick body 10 and a refrigeration module 20. The stick body 10 is roughly conical. The stick body 10 of this embodiment mainly includes a front cover 11, a rear cover 12, an end cover 13, and a temperature transmitting member 14. The front cover 11 is assembled corresponding to the rear cover 12 and locked by screw fixing elements to form a cover assembly. The end cover 13 is assembled on an upper end of the front cover 11 and an upper end of the rear cover 12. The temperature transmitting member 14 is assembled on a lower end of the front cover 11 and a lower end of the rear cover 12. The temperature transmitting member 14 is made of a metal material with good thermal conductivity.

An extension pipe 131 is formed on one side of the end cover 13. The center of the extension pipe 131 has a negative pressure connection hole 132. A first connection pipe 133 is formed on the other side of the end cover 13 and extending away from the extension pipe 131 (i.e., the first connection pipe 133 extends directly below the extension pipe 131). The negative pressure connection hole 132 communicates with the first connection pipe 133. In addition, a first connection port 135 is arranged close to one side of the extension pipe 131 of the end cover 13.

The temperature transmitting member 14 includes a circular disk 141 and a block 142 extending from an inner surface of the circular disk 141. A suction port 143 is formed on one side of the block 142. A second connection pipe 144 extends on one side of the block 142. The second connection pipe 144 communicates with the suction port 143. Two ends of an air pipe 15 communicate with the first connection pipe 133 and the second connection pipe 144 respectively.

The refrigeration module 20 of this embodiment mainly includes a control board 21, a control button 22, a thermoelectric cooling chip 24, and a heat sink 25. The thermoelectric cooling chip 24 is electrically connected to the control board 21. The control board 21 is arranged inside the stick body 10 and is electrically connected to the first connection port 135. The control button 22 and a switch button 23 are installed and electrically connected to the control board 21. Part of the control button 22 and part of the switch button 23 are exposed outside the front cover 11. The thermoelectric cooling chip 24 can activate or deactivate to adjust temperature by the control button 22.

The block 142 includes a chip container 146. The thermoelectric cooling chip 24 is mounted on the chip container 146 and is electrically connected to the first connection port 135. The thermoelectric cooling chip 24 has a cold end 241 and a hot end 242. The cold end 241 is attached to the temperature transmitting member 14, and the hot end 242 is thermally contacted with the heat sink 25. The heat sink 25 may be made of aluminum, copper, or alloy materials. The heat sink 25 mainly includes a bottom plate 251 and a plurality of cooling fins 252 extending upward from the bottom plate 251. A thermally conductive medium (not shown) may be coated between the bottom plate 251 and the hot end 242 to improve thermal conductivity of the heat sink 25.

Further, the outside of the thermoelectric cooling chip 24 is composed of two insulating ceramic substrates. The inside of the thermoelectric cooling chip 24 is composed of multiple sets of P-type and N-type Bismuth Telluride based thermoelectric materials, and conductive copper electrodes in series.

Further, the stick body 10 of this embodiment further includes a waterproof rubber strip assembly 16. The waterproof rubber strip assembly 16 mainly includes a first waterproof strip 161, a second waterproof strip 162, and a third waterproof strip 163. A front groove 111 is arranged on an annular edge of an inner surface of the front cover 11, and a rear groove 121 is arranged on an annular edge of an inner surface of the rear cover 12. Two sides of the first waterproof strip 161 are embedded in the front groove 111 and the rear groove 121. A first embedding groove 134 is arranged on an annular edge of the end cover 13, and a second embedding groove 145 is arranged on an annular edge of the temperature transmitting member 14. Upper part of the first waterproof strip 161 and the second waterproof strip 162 are connected to each other and are jointly embedded in the first embedding groove 134. Lower part of the first waterproof strip 161 and the third waterproof strip 163 are connected to each other and are jointly embedded in the second embedding groove 145. So that, the inside of the stick body 10 has effects such as waterproof and moisture proof.

Further, the stick body 10 of this embodiment further includes a non-slip pad 17, and the non-slip pad 17 is adhered to an outer surface of the rear cover 12 to provide anti-slip and anti-drop effects when held by hands.

Further, the negative pressure massage stick 1 of this embodiment further includes a vibrator 30. A front carrying frame 112 is arranged on a middle section of the inner surface of the front cover 11, and a rear carrying frame 122 is arranged on a middle section of an inner surface of the rear cover 12. The vibrator 30 of this embodiment mainly includes a motor and an eccentric member connected to a shaft of the motor. The eccentric member may be an eccentric wheel or an eccentric block to generate vibration. The vibrator 30 is fixed between the front carrying frame 112 and the rear carrying frame 122, and the vibrator 30 is formed under the control board 21. The vibrator 30 is electrically connected to the control board 21. A switch button 23 is mounted on the control board 21, and the vibrator 30 is activated or deactivated by the switch button 23.

Further, the negative pressure massage stick 1 of this embodiment further includes a negative ion generation module 40. The negative ion generation module 40 is arranged inside the stick body 10, and is electrically connected to the control board 21. The negative ion generation module 40 mainly includes a negative ion generator 41 and a negative ion wire 42 connected to the negative ion generator 41. The block 142 includes a negative ion outlet hole 147. The negative ion generator 41 is mounted behind the control board 21. The negative ion wire 42 bypasses the vibrator 30 and extends into the negative ion outlet hole 147. The negative ion generation module 40 starts to operate immediately after power is turned on.

Further, the negative pressure massage stick 1 of this embodiment further includes a rim cap 50, and the rim cap 50 can insert into and connect to the heat transmitting member 14. The rim cap 50 mainly includes a rim disc 51 and a hollow column 52 extending from the rim disc 51. The hollow column 52 can insert into and connect to the block 142, so that the rim cap 50 is formed under the temperature transmitting member 14. The rim cap 50 is also made of a metal material with good thermal conductivity.

Figure 6:
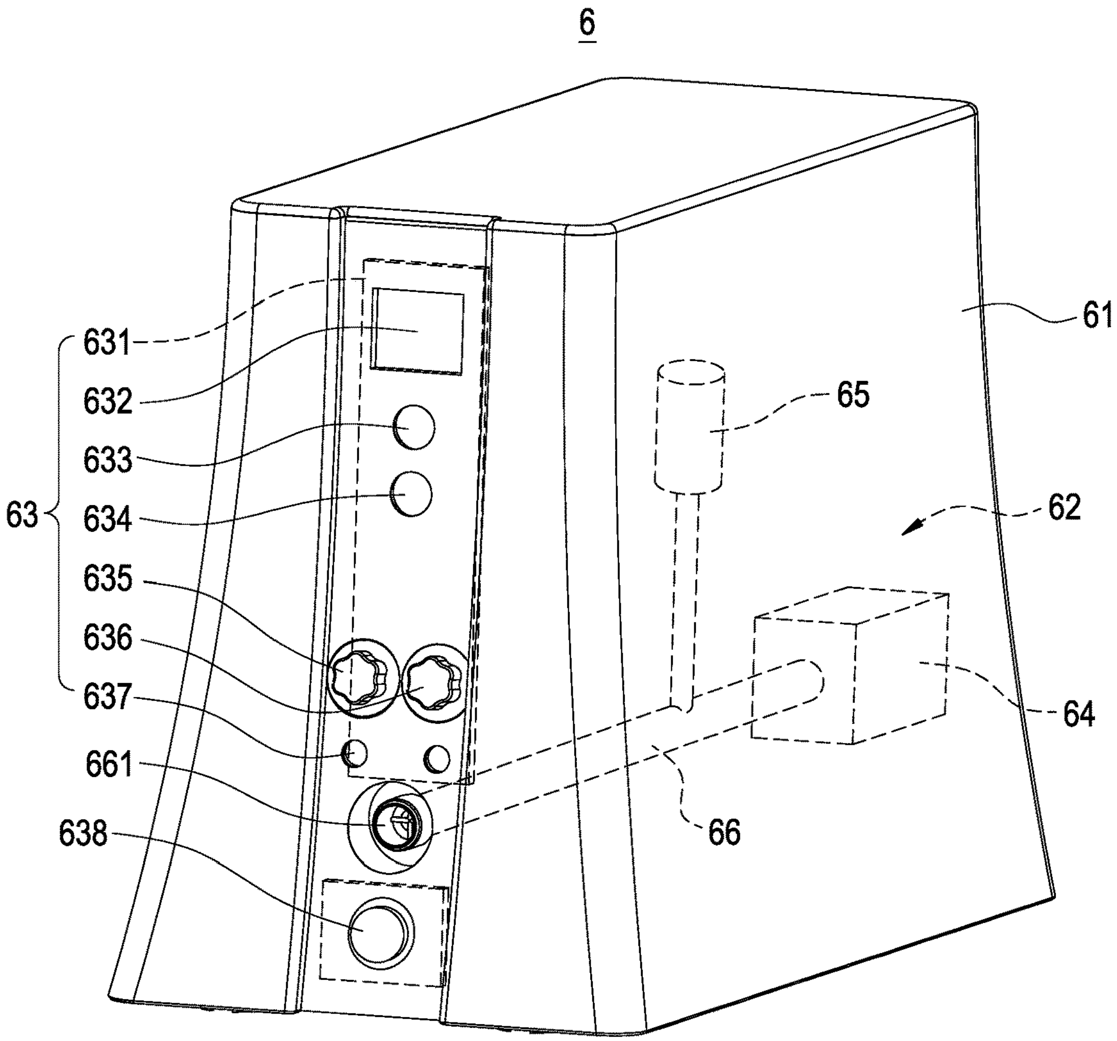
FIG. 6 is a perspective view of an external negative pressure generator of the present disclosure.
Figure 7:
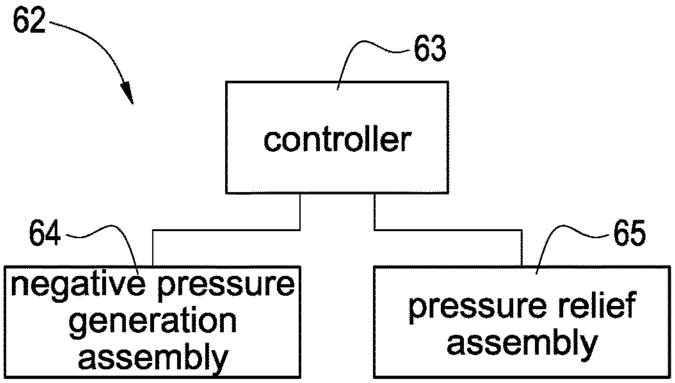
FIG. 7 is a block diagram of a negative pressure drive control module of the present disclosure.

Please refer to FIG. 6 to FIG. 7, the external negative pressure generator 6 mainly includes a housing 61 and a negative pressure drive control module 62 arranged in the housing 61. The negative pressure drive control module 62 mainly includes a controller 63, a negative pressure generation assembly 64, a pressure relief assembly 65, and an air pipe assembly 66. The controller 63 includes a circuit board 631. The circuit board 631 includes a display panel 632, a continuous suction button 633, an intermittent suction and relief button 634, a negative pressure second control button 635, a pressure relief second control button 636, and two second connection ports 637. The second connection port 637 of this embodiment is a DC port. The DC port is electrically connected to the controller 63 through a power button 638. The negative pressure generation assembly 64 and the pressure relief assembly 65 are electrically connected to the controller 63. The air pipe assembly 66 communicates with the negative pressure generation assembly 64 and the pressure relief assembly 65. The air pipe assembly 66 has a negative pressure aperture 661 fixed in the housing 61. The negative pressure generation assembly 64 mainly includes a vacuum pump (not shown) and a motor (not shown), and the negative pressure generation assembly 64 is used to generate a negative pressure. The negative pressure generation assembly 64 generates suction to skin of human through the suction port 143 of the negative pressure massage stick 1. A maximum negative pressure during general use is limited to −46.7 kPa (−350 mmHg).

Please refer to FIG. 1 and FIG. 6. Two ends of the connection pipe 7 are respectively connected to the negative pressure connection hole 132 and the negative pressure aperture 661. Through operation of the negative pressure drive control module 62, the suction port 143 of the negative pressure massage stick 1 can generate a massage with negative pressure or generate a massage with negative pressure and pressure relief alternately. Both the first connection port 135 and the second connection port 637 of this embodiment are a conductive hole. Two ends of the conductive wire 8 are connected to the first connection port 135 and the second connection port 637 respectively. So that, the external negative pressure generator 6 is used to provide power required by the negative pressure massage stick 1 during operation.

When the negative pressure massage stick 1 is used for shoulder and neck or other parts of the human body, the negative pressure massage stick 1 can generate a massage with negative pressure or generate a massage with negative pressure and pressure relief alternately. After the temperature transmitting member 14 or the rim cap 50 is attached to skin of human, due to a vacuum pumping action of the negative pressure generation assembly 64, the suction port 143 generates negative pressure so that the skin is sucked and gradually raised. When the negative pressure stops, the skin stops being sucked up. Afterward, the pressure relief assembly 65 allows air from the air pipe assembly 66 into the air pipe 15, so that the negative pressure is released. When the negative pressure is released, the skin is gradually released back to its original state. In addition, the actions described above can be repeated continuously.

During the operation of the negative pressure massage stick 1, the refrigeration module 20 can be turned on or turned off at any time, and the negative pressure massage stick 1 can relieve redness and swelling of skin due to negative pressure suction process and let the skin enjoy comfortable massage experience of cold feeling. The vibrator 30 can also be activated or deactivated at any time to make the stick body 10 vibrate and improve blood circulation effect of skin. So that the skin and its internal tissues can be fully exercised. Because the negative pressure massage stick 1 improves blood circulation effect of skin, the negative pressure massage stick 1 increases effects of various treatments and reduces production of blood stasis. Furthermore, negative ions generated by the negative ion generator 41 can be led out from end of the negative ion wire 42, thereby enhancing blood circulation of skin.

In addition, the external negative pressure generator 6 of the present disclosure can connect to the negative pressure massage stick 1, and can also connect to other related equipment, such as chest device, cupping device, facial beauty device, etc. The present disclosure has multi-purpose characteristics and can greatly reduce user's purchase cost and use cost.

The present disclosure discloses a negative pressure massage device with cold feeling mechanism and a massage stick thereof, and the present disclosure solves problems of prior art, and can achieve intended purpose. The present disclosure filed an application in accordance with patent law. The present disclosure fully meets requirements of application, and the present disclosure has novelty and non-obviousness. Please check carefully and grant the present disclosure to protect rights of inventor.

What is claimed is:

1. A negative pressure massage device with cold feeling mechanism, comprising:

a negative pressure massage stick comprising:

a stick body comprising a cover assembly, an end cover and a temperature transmitting member connected to two ends of the cover assembly, respectively, and an air pipe; the end cover comprising a negative pressure connection hole and a first connection port, the temperature transmitting member comprising a circular disk, a block extending from an inner surface of the circular disk, and a suction port, the air pipe communicating with the negative pressure connection hole and the suction port;

a refrigeration module arranged inside of the stick body, the refrigeration module comprising a thermoelectric cooling chip mounted on a chip container formed on an outer surface of the block and a heat sink; the thermoelectric cooling chip electrically connected to the first connection port, and the thermoelectric cooling chip comprising a cold end and a hot end, the cold end attached to the temperature transmitting member, the hot end thermally contacted with the heat sink; and a rim cap installed outside of the stick body, comprising a rim disc and a hollow column extending from the rim disc; wherein the hollow column is inserted into and sheathed in an inner surface of the block so that the rim disc encloses an outer surface of the circular disk opposite to the inner surface of the circular disk;

an external negative pressure generator arranged separately from the negative pressure massage stick, the external negative pressure generator comprising a housing, a negative pressure drive control module arranged in the housing, and a second connection port; the negative pressure drive control module comprising an air pipe assembly, and the air pipe assembly comprising a negative pressure aperture arranged in the housing;

a connection pipe, two ends of the connection pipe respectively connected to the negative pressure aperture and the negative pressure connection hole; and a conductive wire, two ends of the conductive wire respectively connected to the first connection port and the second connection port.

2. The negative pressure massage device with cold feeling mechanism as claimed in claim 1, wherein the refrigeration module further comprises a control board and a control button, the thermoelectric cooling chip and the control button are electrically connected to the control board.

3. The negative pressure massage device with cold feeling mechanism as claimed in claim 2, wherein the negative pressure massage stick further comprises a vibrator, the cover assembly comprises a front cover and a rear cover opposite and connected to the front cover; a front carrying frame is arranged on an inner surface of the front cover, a rear carrying frame is arranged on an inner surface of the rear cover; the vibrator is fixed between the front carrying frame and the rear carrying frame, and the vibrator is formed under the control board, the vibrator is electrically connected to the control board.

4. The negative pressure massage device with cold feeling mechanism as claimed in claim 3, wherein the control board further comprises a switch button, and the vibrator is activated or deactivated by the switch button.

5. The negative pressure massage device with cold feeling mechanism as claimed in claim 2, wherein the negative pressure massage stick further comprises a negative ion generation module, the negative ion generation module is arranged inside the stick body and electrically connected to the control board.

6. The negative pressure massage device with cold feeling mechanism as claimed in claim 5, wherein the negative ion generation module comprises a negative ion generator and a negative ion wire connected to the negative ion generator; the temperature transmitting member comprises a block, and the block comprises a negative ion outlet hole, the negative ion wire extends into the negative ion outlet hole.

7. The negative pressure massage device with cold feeling mechanism as claimed in claim 2, wherein an extension pipe is formed on one side of the end cover, the negative pressure connection hole is formed on the extension pipe; a first connection pipe is formed on the other side of the end cover and extending away from the extension pipe, and the negative pressure connection hole communicates with the first connection pipe; a second connection pipe extends on one side of the block, the second connection pipe communicates with the suction port, and two ends of the air pipe communicate with the first connection pipe and the second connection pipe respectively.

8. A negative pressure massage stick with cold feeling mechanism, comprising:

a stick body comprising a cover assembly, an end cover and a temperature transmitting member connected to two ends of the cover assembly, respectively, and an air pipe, the end cover comprising a negative pressure connection hole, the temperature transmitting member comprising a circular disk, a block extending from an inner surface of the circular disk, and a suction port, the air pipe communicating with the negative pressure connection hole and the suction port;

a refrigeration module arranged inside of the stick body, the refrigeration module comprising a thermoelectric cooling chip mounted on a chip container formed on an outer surface of the block and a heat sink, the thermoelectric cooling chip comprising a cold end and a hot end, the cold end attached to the temperature transmitting member, the hot end thermally contacted with the heat sink; and a rim cap installed outside of the stick body, comprising a rim disc and a hollow column extending from the rim disc; wherein the hollow column is inserted into and sheathed in an inner surface of the block so that the rim disc encloses an outer surface of the circular disk opposite to the inner surface of the circular disk.

9. The negative pressure massage stick with cold feeling mechanism as claimed in claim 8, wherein the refrigeration module further comprises a control board and a control button, the thermoelectric cooling chip and the control button are electrically connected to the control board.

10. The negative pressure massage stick with cold feeling mechanism as claimed in claim 9, further comprising a vibrator, the cover assembly comprising a front cover and a rear cover opposite and connected to the front cover; a front carrying frame arranged on an inner surface of the front cover, a rear carrying frame arranged on an inner surface of the rear cover; the vibrator fixed between the front carrying frame and the rear carrying frame, and the vibrator formed under the control board, the vibrator electrically connected to the control board.

11. The negative pressure massage stick with cold feeling mechanism as claimed in claim 10, wherein the control board further comprises a switch button, and the vibrator is activated or deactivated by the switch button.

12. The negative pressure massage stick with cold feeling mechanism as claimed in claim 9, further comprising a negative ion generation module, the negative ion generation module arranged inside the stick body and electrically connected to the control board.

13. The negative pressure massage stick with cold feeling mechanism as claimed in claim 12, wherein the negative ion generation module comprises a negative ion generator and a negative ion wire connected to the negative ion generator; the temperature transmitting member comprises a block, and the block comprises a negative ion outlet hole, the negative ion wire extends into the negative ion outlet hole.

14. The negative pressure massage stick with cold feeling mechanism as claimed in claim 9, wherein an extension pipe is formed on one side of the end cover, the negative pressure connection hole is formed on the extension pipe; a first connection pipe is formed on the other side of the end cover and extending away from the extension pipe, and the negative pressure connection hole communicates with the first connection pipe; a second connection pipe extends on one side of the block, the second connection pipe communicates with the suction port, and two ends of the air pipe communicate with the first connection pipe and the second connection pipe respectively.

15. The negative pressure massage stick with cold feeling mechanism as claimed in claim 9, wherein the end cover comprises a first connection port, and the first connection port is arranged close to one side of the negative pressure connection hole.

16. The negative pressure massage stick with cold feeling mechanism as claimed in claim 8, wherein the stick body further comprises a waterproof rubber strip assembly, the waterproof rubber strip assembly comprises a first waterproof strip, a second waterproof strip, and a third waterproof strip; the cover assembly comprises a front cover and a rear cover opposite and connected to the front cover; a front groove is arranged on an inner surface of the front cover, a rear groove is arranged on an inner surface of the rear cover; a first part of the first waterproof strip is embedded in the front groove and the rear groove; a first embedding groove is arranged on an annular edge of the end cover, a second embedding groove is arranged on an annular edge of the temperature transmitting member; a second part of the first waterproof strip communicates with the second waterproof strip, and the second part of the first waterproof strip and the second waterproof strip are both embedded in the first embedding groove; a third part of the first waterproof strip communicates with the third waterproof strip, and the third part of the first waterproof strip and the third waterproof strip are both embedded in the second embedding groove.

* * * * *